United States Patent

Miyashita

[11] Patent Number: 5,805,979
[45] Date of Patent: Sep. 8, 1998

[54] CONTROL APPARATUS AND CONTROL METHOD FOR ATTENUATING RADIO SIGNAL

[75] Inventor: Mafumi Miyashita, Tokyo, Japan

[73] Assignee: NEC Corporation, Tokyo, Japan

[21] Appl. No.: 581,173

[22] Filed: Dec. 29, 1995

[30] Foreign Application Priority Data

Dec. 30, 1994 [JP] Japan ................................ 6-340428

[51] Int. Cl.⁶ .............................. H04B 7/00; H04Q 3/02; H04Q 9/14
[52] U.S. Cl. ..................... 455/38.2; 455/343; 455/149.1; 340/825.44
[58] Field of Search ................................ 455/38.3, 149.1, 455/149.2, 250.1, 343, 38.2, 38.1; 340/825.44

[56] References Cited

U.S. PATENT DOCUMENTS 5,144,296  9/1992  DeLuca et al. ..................... 340/825.44
5,448,774  9/1995  Yokozaki et al. ........................ 455/343

FOREIGN PATENT DOCUMENTS 0 520 803   12/1992   European Pat. Off. .
2 285 327   7/1995    United Kingdom .
WO 93/22848  11/1993  WIPO .

*Primary Examiner*—Reinhard J. Eisenzopf
*Assistant Examiner*—Darnell R. Armstrong
*Attorney, Agent, or Firm*—Foley & Lardner

[57] ABSTRACT

A radio apparatus judges whether the electric field intensity of a radio signal detected by a level detector is high by a comparator. The radio apparatus detects a synchronizing signal for making synchronization with the radio apparatus from the radio signal by a synchronizing signal detector. Moreover, the radio apparatus detects the bit rate of an information stop signal in a system using a POCSAG signal of a radio selective-calling receiver from the radio signal by a stop signal detector. When the electric field intensity of the radio signal is high, the synchronizing signal is not detected, and the bit rate of the information stop signal is not detected, the radio apparatus decides by a decision circuit that cross modulation occurs in the radio signal and attenuates the radio signal by turning on an attenuator.

19 Claims, 8 Drawing Sheets

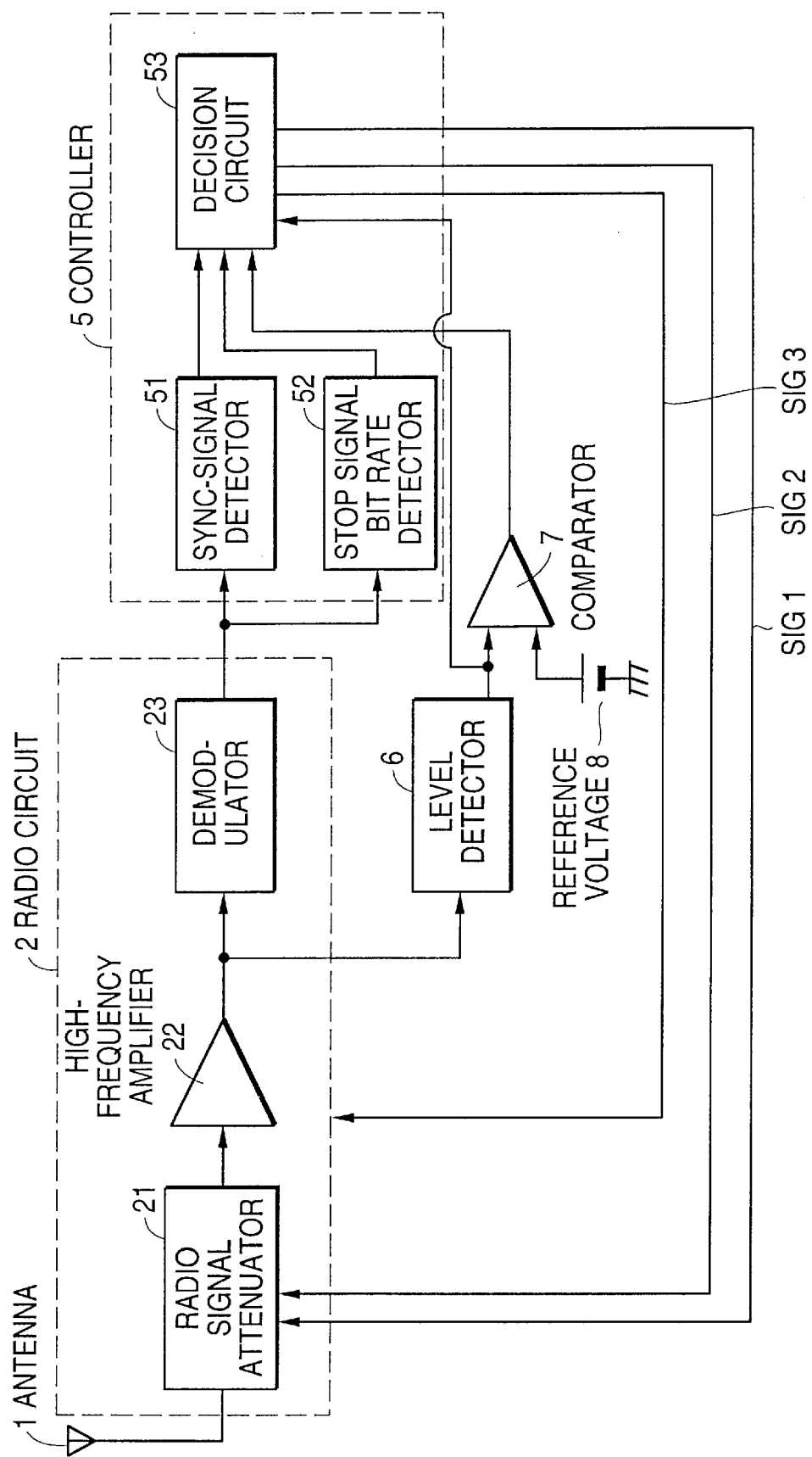

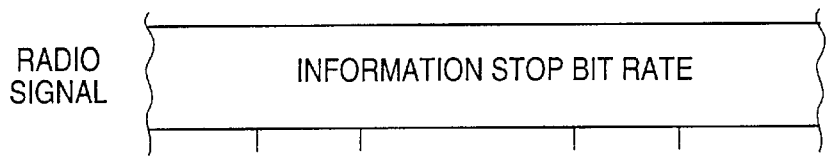
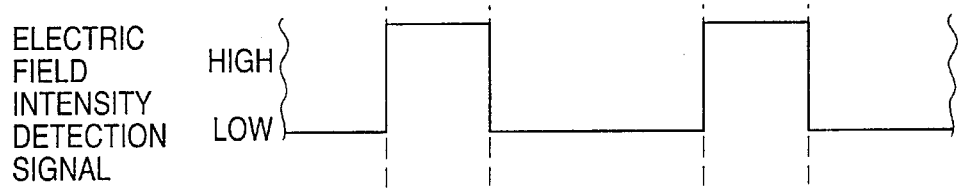
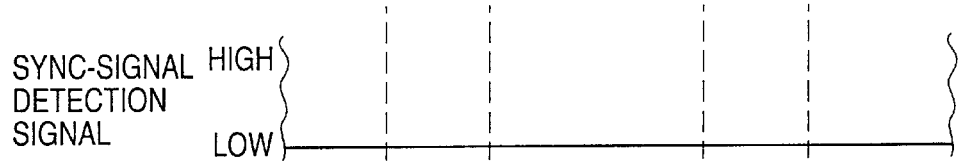
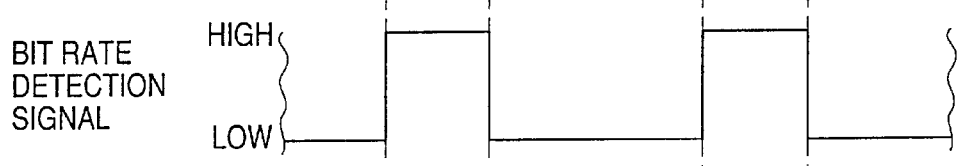
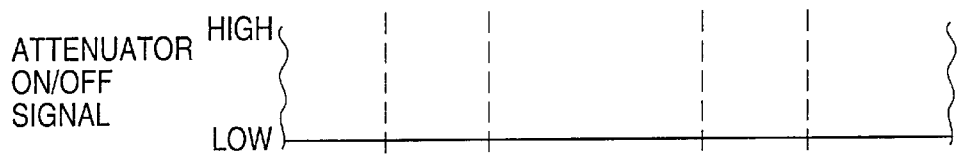
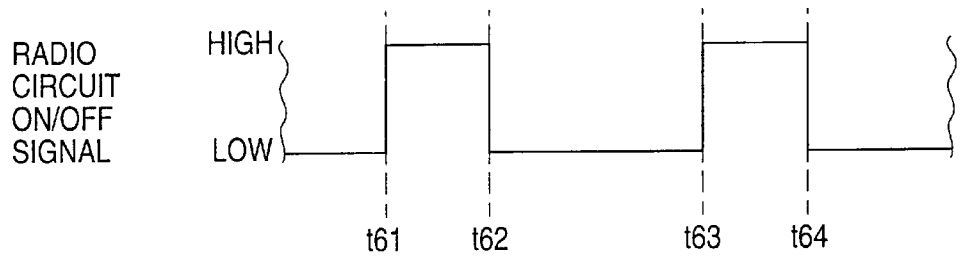

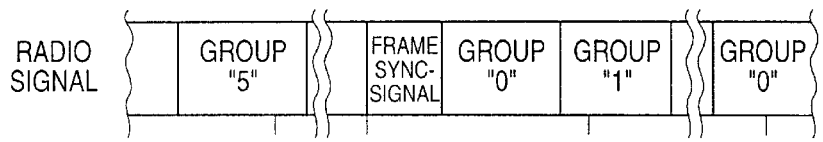
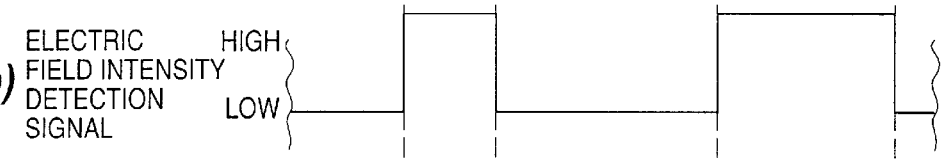
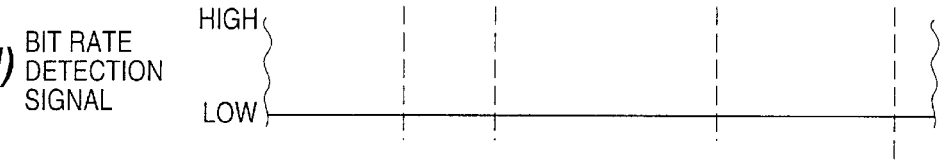
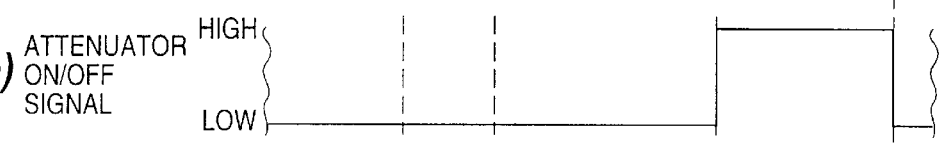
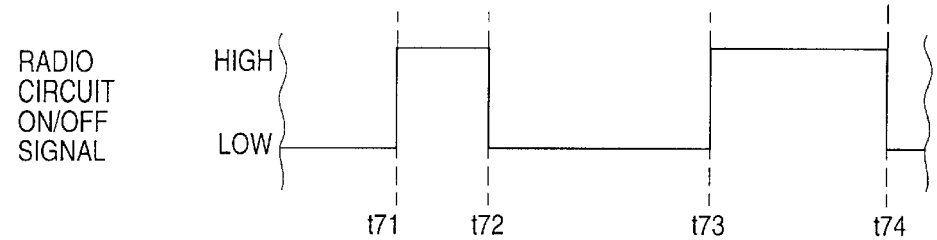

5,805,979

CONTROL APPARATUS AND CONTROL METHOD FOR ATTENUATING RADIO SIGNAL

BACKGROUND OF THE INVENTION

The present invention relates to a radio system, particularly to the radio system having a control apparatus and a control method for attenuating a radio signal received.

In the case of this conventional type of the radio system, it is difficult to detect a desired signal out of cross-modulated signals even at a place where a desired wave received by the radio system has an adequate electric-field intensity if a radio signal other than the radio signal of the radio system serves as a disturbance wave, their electric fields interfere each other, and cross modulation occurs when the former radio signal has a very-high electric-field intensity. Therefore, because the conventional radio system includes a disturbance wave in a signal detected by a tuner, the system cannot detect only signals having a desired frequency out of cross-modulated radio signals and thus, the receiving efficiency of the radio system is greatly lowered.

Therefore, a radio system is proposed which uses a circuit for attenuating a radio signal when cross modulation occurs so that a disturbance wave is not included in a frequency detected by a tuner.

As a radio system to which the above attenuation circuit is applied, there is "A method and apparatus for improving message receiver radio in a paging system" with the Ser. No. 08/365,434 filed by the same applicant as this application in U.S. on Dec. 28, 1994.

In the case of this paging system, no synchronizing signal is detected when the radio circuit of the system is turned on. Moreover, when the electric field intensity of a received radio signal is larger than a predetermined value, the system judges that cross modulation occurs in the radio signal and turns on its attenuation circuit to attenuate the radio signal and tries to detect a synchronizing signal.

SUMMARY OF THE INVENTION

It is an object of the present invention to provide an attenuation control apparatus and an attenuation control method for further improving the battery saving efficiency compared to the art of the prior application.

It is another object of the present invention to provide an attenuation control apparatus and an attenuation control method for turning off the attenuation circuit of a radio system when a radio signal is not a signal which should be received by the system.

It is still another object of the present invention to provide an attenuation control apparatus and an attenuation control method for turning off the attenuation circuit of a radio selective-calling receiver when the bit rate of an information stop signal is detected in the synchronization making mode of the receiver.

To achieve the above objects, the control apparatus of the present invention comprises a receiver for receiving a radio signal, an electric-field detection circuit for detecting the electric field intensity of the radio signal, an attenuator for attenuating the radio signal, a first judgment circuit for judging whether the electric field intensity is high, a second judgment circuit for judging whether a synchronizing signal is included in the radio signal, a third judgment circuit for judging whether the radio signal is a signal which should be received by a radio apparatus when it is decided by the first judgment circuit that the electric field intensity of the radio signal is high and it is decided by the second judgment circuit that no synchronizing signal is included in the radio signal, and an attenuation control circuit for turning off the attenuator when it is decided by the third judgment circuit that the radio signal is not a signal which should be received by the radio apparatus and turning on the attenuator when it is decided by the third judgment circuit that the radio signal is a signal which should be received by the radio apparatus.

Moreover, the control method of the present invention comprises the steps of performing first judgment for judging whether the electric field intensity of a radio signal is high, performing second judgment for judging whether a synchronizing signal is included in the radio signal, judging whether the radio signal is a signal which should be received by a radio apparatus when it is decided by the first judgment that the electric field intensity of the radio signal is high and it is decided by the second judgment that no synchronizing signal is included in the radio signal, and attenuating the radio signal when it is decided that the radio signal is a signal which should be received by the radio apparatus.

Because the present invention turns off an attenuation circuit when it is decided that a radio signal is not a signal which should be received by a radio apparatus by using the above structure and method, it is possible to reduce unnecessary battery consumption that is caused by having the attenuation circuit turned at times when it is unnecessary to receive the radio signal.

BRIEF DESCRIPTION OF THE DRAWINGS

These and other objects, features, and advantages of the invention will become more fully apparent from the following detailed description taken in conjunction with the accompanying drawings.

FIG. 2 is a functional block diagram showing an embodiment of the attenuation control apparatus of the present invention;

FIGS. 7(a) to 7(f) are timing charts for explaining operations of the attenuation control apparatus of the present invention when a radio signal is an information stop signal; and FIGS. 8(a) to 8(f) are timing charts for explaining operations of the attenuation control apparatus of the present invention when radio signals are cross-modulated.

DETAILED DESCRIPTION OF THE PREFERRED EMBODIMENTS

Figure 1A:
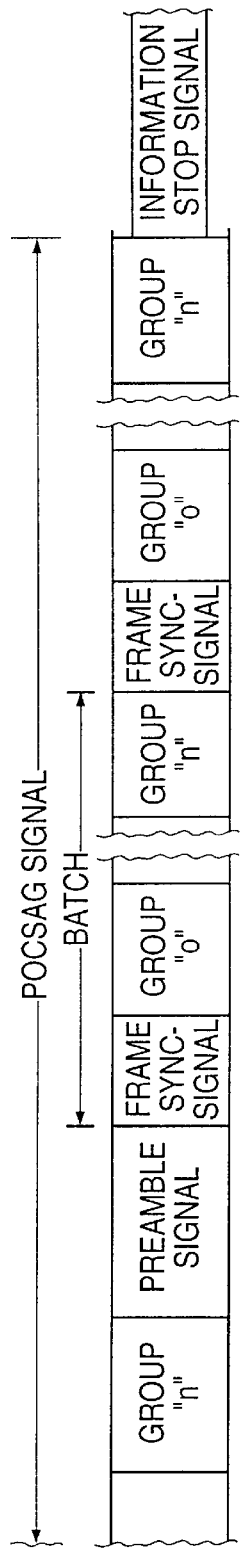
FIGS. 1(a) to 1(d) are signal format diagrams showing radio signals which should be received by a radio system to which the present invention is applied.
Figure 1B:
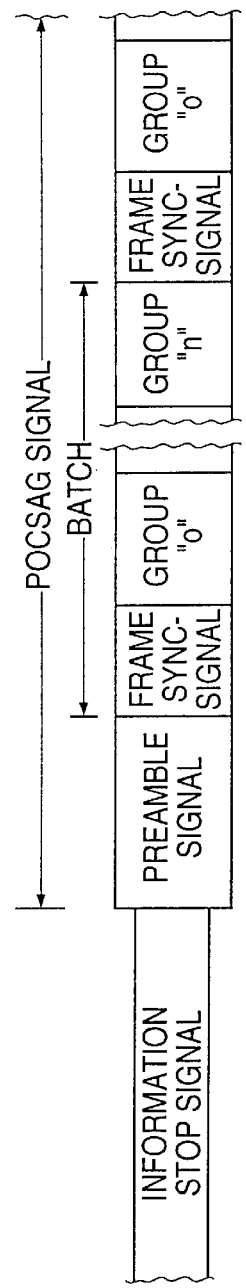

FIGS. 1(a) and 1(b) are signal formats of POCSAG signals received by a radio selective-calling receiver, including preamble signals and batches.

The preamble signal is a signal which shows that a radio signal is a POCSAG signal and makes bit synchronization between a radio signal and a radio selective-calling receiver. The preamble signal is irregularly transmitted from a base station, which is inserted between batches or between an information stop signal and a batch. To make bit synchronization with a radio signal, a radio selective-calling receiver does not always need to detect a preamble signal but the receiver can also make bit synchronization with the radio signal by detecting the bit rate of a POCSAG signal.

The batch includes a frame synchronizing signal and eight groups of group "0" to group "7".

The frame synchronizing signal is a signal inserted into the head of a batch, and for making frame synchronization between a radio signal and a radio selective-calling receiver. The synchronizing signal of this embodiment to be mentioned later is a frame synchronizing signal.

Figure 1C:
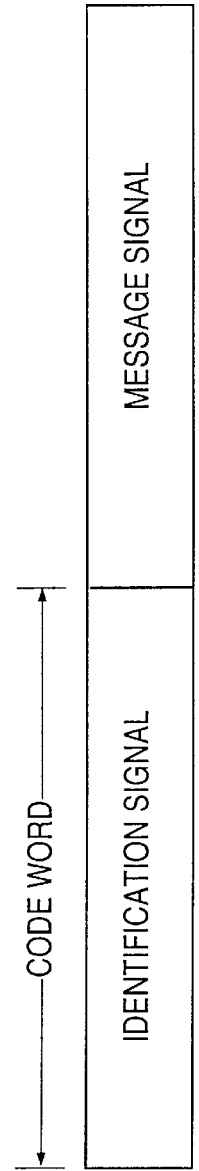
Figure 1D:
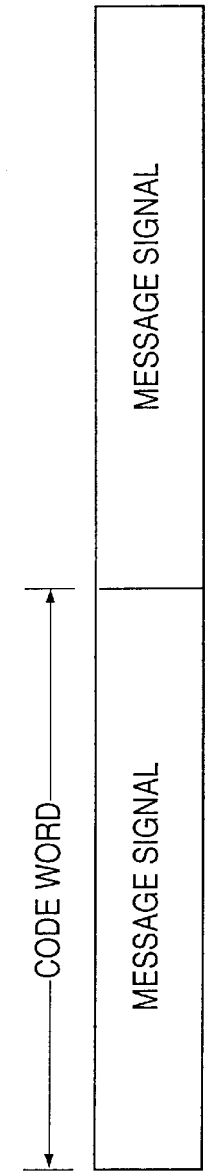

Each of the groups "0" to "7" has a signal format comprising 2 code words as shown in FIGS. 1(c) and 1(d). Each code word includes any one of an identification signal and a message signal.

The information stop signal is a signal comprising alternate data of "1" and "0", which is transmitted from a base station when no POCSAG signal is transmitted in a system using a POCSAG signal format. The information stop signal does not include a signal which should be received by a radio selective-calling receiver because it is not a POCSAG signal and its bit rate is different from that of the POCSAG signal. The bit rate of the information stop signal is, for example, 300 bps or 750 bps.

In FIG. 2, an antenna 1 receives a radio signal from a not-illustrated base station and outputs the received signal to a radio circuit 2. The radio circuit 2 is provided with a radio signal attenuator (hereafter referred to as an attenuator) 21, a high-frequency amplifier 22, and a demodulator 23, and turned on/off in accordance with a radio-section on/off signal transmitted through a signal line SIG3 extended from a controller 5. The attenuator 21 is turned on/off in accordance with an attenuator on/off signal transmitted through a signal line SIG1 extended from the controller 5. The attenuator 21 attenuates a signal received through the antenna 1 by an attenuation value set by a control signal transmitted through a signal line SIG2 extended from the control section 5 when the attenuator 21 is turned on, and outputs the attenuated signal to the high-frequency amplifier 22. The high-frequency amplifier 22 amplifies a high-frequency component output from the attenuator 21 and outputs the amplified signal to the demodulator 23 and a level detector 6. The demodulator 23 has a not-illustrated built-in tuner to extract a signal with a desired frequency out of amplified signals output from the high-frequency amplifier 22. The demodulator 23 demodulates the extracted desired frequency and outputs the demodulated signal to the controller 5.

The level detector 6 detects the electric field intensity of a radio signal by converting an amplified signal output from the high-frequency amplifier 22 into a DC signal and outputs an electric-field intensity signal to a comparator 7 and the controller 5. One end of a reference voltage 8 is grounded and the other end of it is connected to the comparator 7 to output a DC signal at a predetermined constant voltage to the comparator 7 as a reference signal. The comparator 7 compares the electric-field intensity signal output from the level detector 6 with the reference signal output from the reference voltage 8, and outputs a high-level electric-field intensity decision signal to the controller 5 when the voltage of the electric-field intensity signal is higher than that of the reference signal and a low-level electric-field intensity decision signal when the voltage of the electric-field intensity signal is equal to or lower than that of the reference signal.

The controller 5 is provided with a synchronizing signal detector 51, a stop signal bit rate detector 52, and a decision circuit 53. The synchronizing signal detection circuit 51 judges whether a synchronizing signal is included in a demodulated signal output from the demodulating section 23 of the radio circuit 2, and outputs a high-level synchronizing-signal detection signal to the decision circuit 53 when the synchronizing signal is included in the demodulated signal and a low-level synchronizing-signal detection signal to the decision circuit 53 when the synchronizing signal is not included in the demodulated signal. The stop signal bit rate detector 52 judges whether the bit rate of a demodulated signal output from the demodulating section 23 of the radio section 2 is equal to that of an information stop signal, and outputs a high-level bit-rate detection signal to the decision circuit 53 when the bit rate of an information stop signal is included in the bit rate of a demodulated signal and a low-level bit-rate detection signal to the decision circuit 53 when the bit rate of the information stop signal is not included in that of the demodulated signal.

The decision circuit 53 comprises a general-purpose microprocessor and outputs a radio circuit on/off signal for turning on/off the radio circuit 2 at predetermined time intervals to the radio circuit 2 through the signal line SIG3 when it tries to make synchronization with a radio signal by the fact that a radio selective-calling receiver receives a synchronizing signal (hereafter referred to as synchronization making mode). The decision circuit 53 outputs a high-level attenuator on/off signal to the signal line SIG1 to turn on the attenuator 21 when an electric-field intensity decision signal output from the comparator 7 is high-level and a synchronization detection signal output from the synchronizing signal detector 51 and a bit-rate detection signal output from the stop signal bit rate detector 52 are low-level. After the attenuator 21 is turned on, the decision circuit 53 transmits a control signal proportional to the DC voltage of an electric-field intensity signal output from the level detector 6 to the attenuator 21 through the signal line SIG2 and sets the attenuation value of the attenuator 21.

Figure 3:
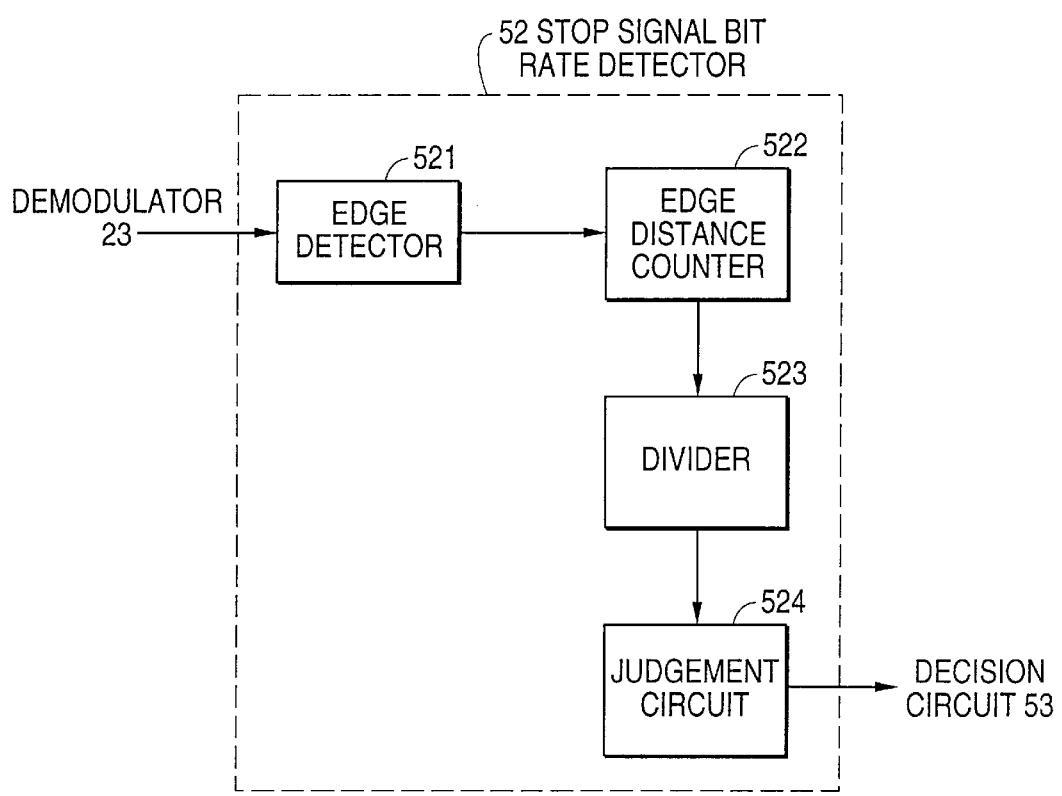
FIG. 3 is a functional block diagram of the information stop signal detector shown in FIG. 2.

In FIG. 3, the stop signal detector 52 includes a edge detector 521, an edge-distance detector 522, a divider 523 and a judgement circuit 524.

The edge detector 521 detects a shift point of a value of the bit, e.g., shift point from "0" to "1" or "1" to "0", as an edge. The edge detector 521 supplies an edge detection signal to the edge-distance detector 522. The edge-distance detector 522 counts a distance between each edge and outputs an edge-distance signal indicating a count value to the divider 523. The divider 523 divides the count value by n, which is an integral number, and supplies a divided signal indicating a bit rate to the judgement circuit 524. The judgement circuit 524 judges whether the bit rate detected by the divided signal is in the range of permission of the bit rate of the information stop signal, and if same bit rate is detected several times, outputs a high-level bit-rate detection signal to the decision circuit 53 when the detected bit rate is considered as the bit rate of the information stop signal, i.e., when the bit rate of the received signal is considered that of the information stop signal. The judgement circuit 524 supplies a low-level signal bit-rate detection signal to the decision circuit 53 when the bit rate of the information stop signal is not detected in the bit rate indicated by the divided signal.

The present invention attenuates a radio signal by using the above structure. A radio-signal attenuation method by the present invention is described below by referring to the flowchart shown in FIG. 4.

Figure 4:
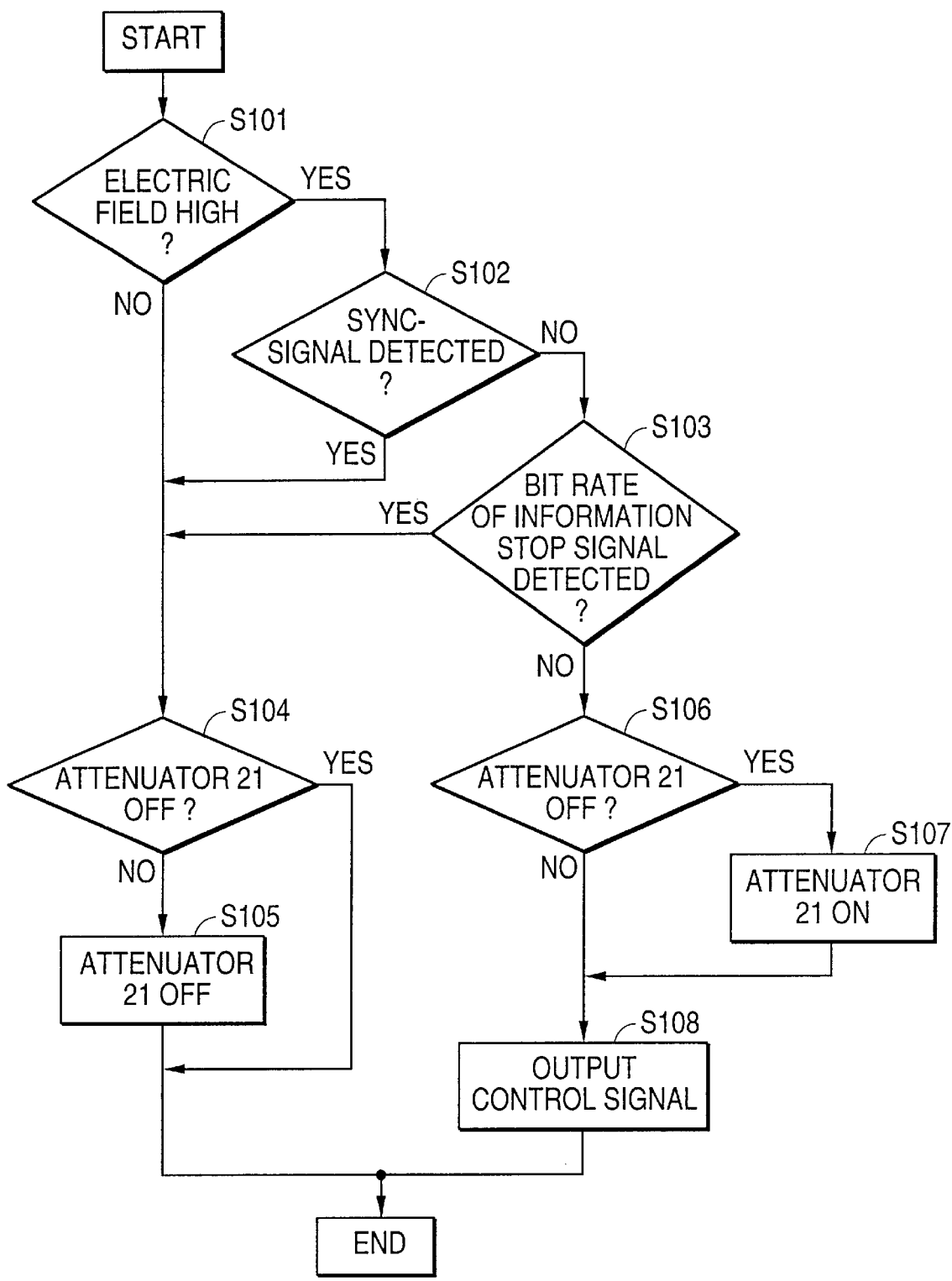
FIG. 4 is a flowchart for explaining operations of the attenuation method of the present invention.

In FIG. 4, the decision circuit 53 judges whether an electric-field intensity decision signal output from the comparator 7 is high-level in order to judge whether a radio signal is a strong electric-field signal (S101). When the decision circuit 53 decides that the electric field decision signal is high-level in the processing in S101, it judges whether a synchronizing-signal detection signal output from the synchronizing signal detector 51 is high-level in order to judge whether a synchronizing signal is included in the radio signal (S102). When the decision circuit 53 decides that the synchronizing signal detection signal is low-level in the processing in S102, it judges whether a bit-rate signal output from the stop signal detector 52 is high-level in order to judge whether the bit rate of the radio signal is equal to that of an information stop signal (S103).

When the decision circuit 53 decides that the radio signal is not a strong electric-field signal in the processing in S101, that a synchronizing signal is included in the radio signal in the processing in S102, or that the bit rate of the radio signal is equal to that of the information stop signal in the processing in S103, the circuit 53 judges whether the attenuation circuit 21 is turned off by the signal line SIG1 (S104). When the decision circuit 53 decides that the attenuator 21 is not turned off in the processing in S104, the circuit 53 turns off the attenuator 21. When the decision circuit 53 decides that the attenuator 21 is turned off in the processing in S104 or completes the processing in S105, the decision circuit 53 terminates radio-signal attenuation control.

When the decision circuit 53 decides that the bit rate of the radio signal is not equal to that of the information stop signal in the processing in S103, the decision circuit 53 judges whether the attenuator 21 is turned off (S106). When the decision circuit 53 decides that the attenuator 21 is turned off in the processing in S106, the decision circuit 53 turns on the attenuator 21 by the signal line SIG1. When the decision circuit 53 decides that the attenuator 21 is not turned off or completes the processing in S107, the decision circuit 53 outputs a control signal to the attenuator 21 by the signal line SIG2 and sets the attenuation value of the attenuator 21 to a value proportional to the electric field intensity of the radio signal (S108). When the decision circuit 53 completes the processing in S108, the decision circuit 53 terminates radio-signal attenuation control.

Then, attenuation control by the present invention is described below by referring to the timing charts shown in FIGS. 5(a) to 5(f) and 8(a) to 8(f).

Figure 5A:
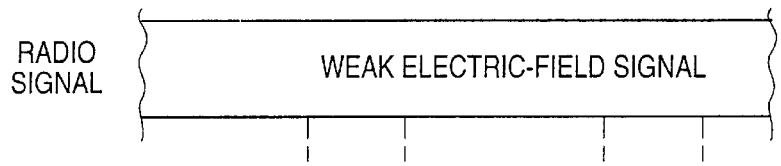
FIGS. 5(a) to 5(f) are timing charts for explaining operations of the attenuation control apparatus of the present invention when a radio signal has a weak electric field.
Figure 5B:
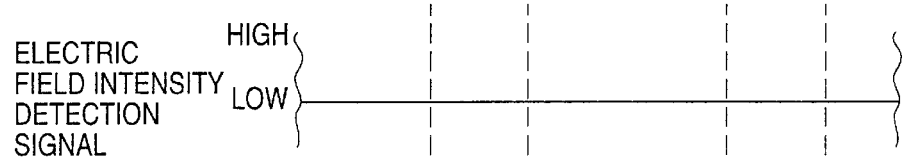
Figure 5C:
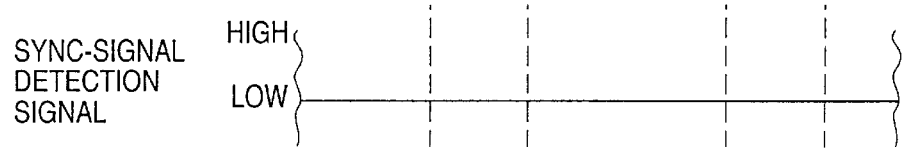
Figure 5D:
Figure 5E:
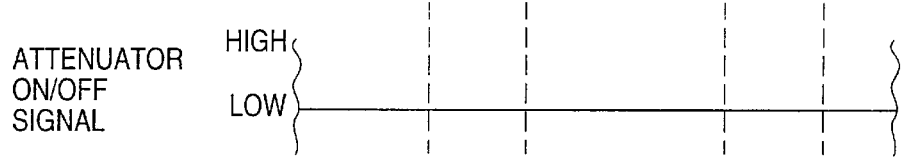
Figure 5F:
Figure 6A:
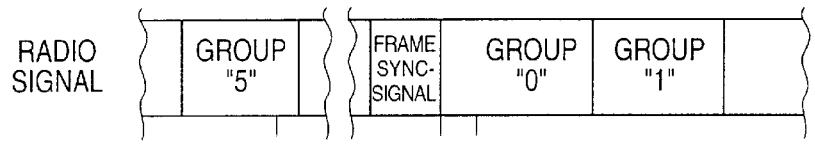
FIGS. 6(a) to 6(f) are timing charts for explaining operations of the attenuation control apparatus of the present invention when a synchronizing signal is included in a radio signal.
Figure 6B:
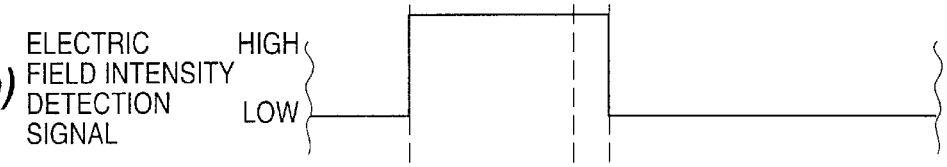
Figure 6C:
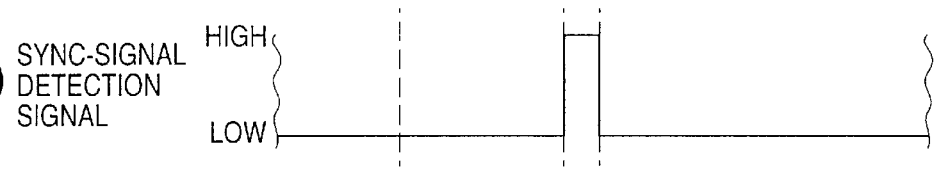
Figure 6D:
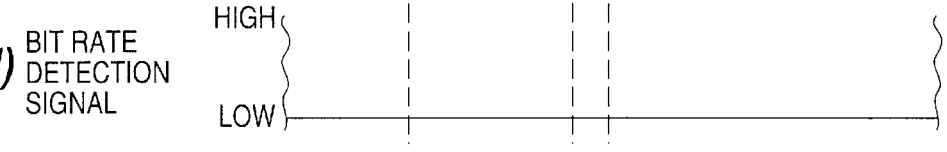
Figure 6E:
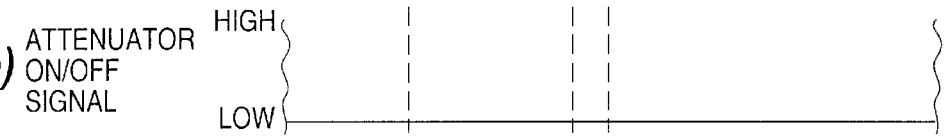
Figure 6F:
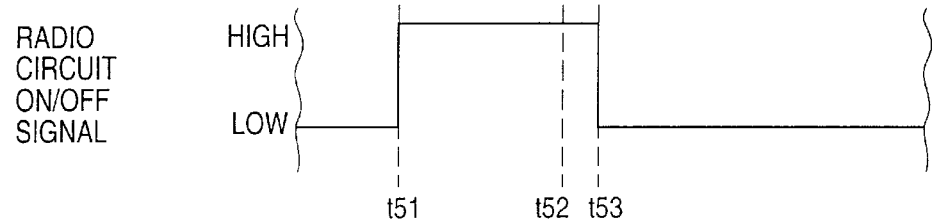

FIGS. 5(a) to 5(f) are flowcharts showing the on/off control of the attenuator 21 when the antenna 1 receives a weak electric-field signal. FIG. 5(a) shows a radio signal received by the antenna 1, FIG. 5(b) shows an electric-field intensity decision signal output by the comparator 7, and FIG. 5(c) shows a synchronizing-signal detection signal output by the synchronizing signal detector 51. FIG. 5(d) shows a bit-rate detection signal output by the stop signal detector 52, FIG. 5(e) shows an attenuator on/off signal output by the decision circuit 53, and FIG. 5(f) shows a radio-section on/off signal output by the decision circuit 53.

In FIGS. 5(a) to 5(f), when the radio selective-calling receiver is in the synchronization making mode, the decision circuit 53 outputs a radio circuit on/off signal and turns on/off the radio circuit 2 at predetermined time intervals. The decision circuit 53 resets the radio circuit on/off signal from low level to high level at the time t41 and turns on the radio circuit 2 having been turned off. In this case, the attenuator 21 is turned off because the attenuator on/off signal is low-level. The weak electric-field signal received by the antenna 1 is amplified by the high-frequency amplifier 22 and output to the demodulator 23 and the level detector 6. The level detector 6 detects the electric field intensity of a radio signal and compares the radio signal with the predetermined reference signal by the comparator 7. Because the radio signal is a weak electric-field signal, an electric-field intensity decision signal output from the comparator 7 becomes low-level. Then, the synchronizing signal detector 51 cannot detect a synchronizing signal from a demodulated signal because the radio signal is a weak electric-field signal and therefor, the synchronizing-signal detection signal becomes low-level. Moreover, because the stop signal detector 52 cannot detect the bit rate of the information stop signal, the bit-rate detection signal also becomes low-level. Then, because the electric-field intensity decision signal is low-level, the decision circuit 53 resets the radio circuit on/off signal from high level to low level at the time t42 when a predetermined time passes and turns off the radio circuit 2 having been turned on. Then, the decision circuit 53 resets the radio-circuit on/off signal from low level to high level at the time t43 when a predetermined time passes and turns on the radio circuit 2 having been turned off. In this case, the attenuator on/off signal output from the decision circuit 53 becomes low-level because the electric field intensity of the radio signal is smaller than the predetermined value when the radio circuit 2 is turned on last time, and the attenuator 21 is kept turned off. Hereafter, operations same as those described above are repeated as long as the radio signal is a weak electric field signal.

FIGS. 6(a) to 6(f) are flowcharts showing on/off control of the attenuator 21 when a synchronizing signal is included in a radio signal received by the antenna 1.

In FIGS. 6(a) to 6(f), when the radio selective-calling receiver is in the synchronization making mode, the decision circuit 53 outputs a radio circuit on/off signal and turns on/off the radio circuit 2 at predetermined time intervals. The decision circuit 53 resets the radio circuit on/off signal from low level to high level at the time t51 and turns on the radio circuit 2 having been turned off. In this case, because the attenuator on/off signal is low-level, the attenuator 21 is turned off and the antenna 1 receives a POCSAG signal from a base station. The received signal is amplified by the high-frequency amplifier 22 and output to the amplifier 23 and the level detector 6. The level detector 6 detects the electric field intensity of a radio signal and the radio signal is compared with the predetermined reference signal by the comparator 7. The radio signal is a strong electric-field signal because the signal is a POCSAG signal and an electric-field intensity decision signal output from the comparator 7 becomes high-level. The synchronizing signal detector 51 detects a synchronizing signal from a demodulated signal and keeps a synchronizing-signal detection signal high-level for the period between the time t52 and the time t53. Because the signal currently received is a POCSAG, the stop signal detector 52 cannot detect the bit rate of an information stop signal and a bit-rate detection signal becomes low-level. Then, the decision circuit 53 judges whether a calling signal following the synchronizing signal relates to a frame included in its own system. When the calling signal does not relate to the frame included in its own system, the decision circuit 53 resets the radio-circuit on/off signal from high level to low level at the time t53 and turns off the radio circuit 2 having been turned on. Because the synchronizing signal included in the radio signal is detected and the synchronization between the radio selective-calling receiver and the radio signal is made, the decision circuit 53 decides that the radio signal is not a cross-modulated signal as long as the synchronization with the radio signal is not cancelled and sets the attenuator on/off signal to low level. Therefore, the attenuator 21 is kept turned off.

FIGS. 7(a) to 7(f) are flowcharts showing on/off control of the attenuator 21 when the bit rate of an information stop signal is included in a radio signal received by the antenna 1.

In FIGS. 7(a) to 7(f), when the radio selective-calling receiver is in the synchronization making mode, the decision circuit 53 outputs a radio-circuit on/off signal and turns on/off the radio circuit 2 at predetermined time intervals. The decision circuit 53 resets a radio-circuit on/off signal from low level to high level at the time t61 and turns on the radio circuit 2 having been turned off. In this case, because the attenuator on/off signal is low-level, the attenuator 21 is turned off. The antenna 1 receives a radio signal or an information stop signal from a base station. The received signal is amplified by the high-frequency amplifier 22 and output to the demodulator 23 and the level detector 6. The level detector 6 detects the electric field intensity of the radio signal and the radio signal is compared with the predetermined reference signal by the comparator 7. The radio signal is a strong electric-field signal for the information stop signal and an electric-field intensity decision signal output from the comparator 7 is reset from low level to high level. Because the synchronizing signal detector 51 cannot detect a synchronizing signal from the demodulated signal output from the demodulator 23, the synchronizing-signal detection signal becomes low-level. Then, the stop signal detector 52 detects the bit rate of the information stop signal and the bit-rate detection signal is reset from low level to high level. Because the synchronzing-signal detection signal is low-level, the decision circuit 53 resets the radio circuit on/off signal from high level to low level at the time t62 when a predetermined time passes and turns off the radio circuit 2 having been turned on. Moreover, the decision circuit 53 resets the radio-circuit on/off signal from low level to high level at the time t63 when a predetermined time passes. In this case, the attenuator on/off signal output from the decision circuit 53 becomes low-level because the radio signal has a bit rate equal to the bit rate of the information stop signal when the radio circuit 2 is turned on last time, and the attenuator 21 is kept turned off. Hereafter, operations same as those described above are repeated as long as the radio signal serves as the information stop signal.

FIGS. 8(a) to 8(f) are flowcharts showing on/off control of the attenuator 21 when a radio signal received by the antenna 1 is cross-modulated.

In FIGS. 8(a) to 8(f), when the radio selective-calling receiver is in the synchronization making mode, the decision circuit 53 outputs a radio circuit on/off signal and turns on/off the radio circuit 2 at predetermined time intervals. The decision circuit 53 resets the radio-circuit on/off signal from low level to high level at the time t71 and turns on the radio circuit 2 having been turned off. In this case, because a attenuator on/off signal is low-level, the attenuator 21 is turned off and the antenna 1 receives a radio signal from a base station, that is, a signal according to the POCSAG signal format. The received signal is amplified by the high-frequency amplifier 22 and output to the demodulator 23 and the level detector 6. The level detector 6 detects the electric field intensity of the radio signal and the radio signal is compared with the predetermined reference signal by the comparator 7. The radio signal is a strong electric-field signal because it is a signal according to the POCSAG signal format, and an electric-field intensity decision signal output from the comparator 7 is reset from low level to high level. The synchronizing signal detector 51 judges whether it is possible to detect a synchronizing signal or a preamble signal according to the POCSAG signal format and a frame synchronizing signal from the demodulated signal. In the timing charts shown in FIG. 8, because the radio signal is cross-demodulated, the synchronizing signal detector 51 cannot detect the synchronizing signal and the synchronizing-signal detection signal becomes low-level. Moreover, the stop signal detector 52 cannot detect the bit rate of the information stop signal and the bit-rate detection signal also becomes low-level. Because the synchronizing-signal detection signal is low-level, the decision circuit 53 resets the radio-section on/off signal from high level to low level at the time t72 when a predetermined time passes and turns off the radio circuit 2 having been turned on. Moreover, the decision circuit 53 resets the radio-section on/off signal from low level to high level at the time t73 when a predetermined time passes and turns on the radio circuit 2 having been turned off. In this case, the decision circuit 53 decides that the received signal is cross-demodulated because the radio signal is a strong electric-field signal and the bit rates of the synchronizing signal and information stop signal are not detected when the radio circuit 2 is turned on last time, resets the attenuator on/off signal from low level to high level, and turns on the attenuator 21 having been turned off. Then, the decision circuit 53 outputs a control signal to the attenuator 21 through the transmission line SIG2 in order to set the attenuation of the attenuator 21 to a value proportional to the voltage of an electric-field intensity signal output from the level detector 6. Hereafter, the attenuator 21 having been turned off is turned on whenever the radio circuit 2 is turned on when the radio signal becomes a weak electric-field signal or as long as the bit rate of a synchronizing signal or information stop signal is not detected from the radio signal and an attenuation value is set to a value proportional to the electric field intensity of the radio signal.

In the case of the radio selective-calling receiver of the prior application, a radio signal is attenuated by turning on an attenuator 21 having been turned off when the radio signal is a strong electric-field signal and a synchronizing signal cannot be detected from the radio signal. When the radio selective-calling receiver is in the synchronization making mode, it does not need to receive any radio signal other than a synchronizing signal. Therefore, even in this case, turning on an attenuator 2 having been turned off deteriorates the batter saving efficiency.

In the case of the present invention, because a radio selective-calling receiver does not turn on an attenuator 21 having been turned off when the receiver decides that a signal is not a signal to receive, it is possible to greatly improve the battery saving efficiency compared to a conventional ratio selective-calling receiver. Moreover, this type of the theme is a theme found by the present invention and the present invention is constituted by noticing the bit rate of an information stop signal in a system using a POCSAG signal so that a radio selective-calling receiver decides that the information stop signal is not a radio signal to receive when detecting the bit rate of the signal as an example of means for realizing the theme.

Moreover, the art for a radio selective-calling receiver to judge whether the bit rate of an information stop signal is detected is only an example for realizing the technical though for the radio selective-calling receiver to judge whether a signal is a radio signal to receive. Therefore, it is also possible to use a detector for detecting the bit rate of a radio signal to receive so that an attenuator is turned off when receiving a radio signal with a bit rate different from that of the radio signal to receive. The radio selective-calling receiver can detect not only an information stop signal but also a radio signal unnecessary to receive.

Moreover, the present invention is not restricted to a radio selective-calling receiver but it can be applied to every radio system for detecting a desired signal from cross-modulated radio signals.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. A control unit for attenuating a radio signal received by a radio apparatus comprising:

reception means for receiving a radio signal;

electric-field detection means for detecting an electric field intensity of said radio signal;

attenuation means for attenuating said radio signal;

first judgment means for judging whether the electric field intensity is high;

second judgment means for judging whether a synchronizing signal is included in said radio signal;

third judgment means for judging whether said radio signal is a signal which should be received by said radio apparatus when said first judgment means decides that the electric field intensity of said radio signal is high and said second judgment means decides that said synchronizing signal is not included in said radio signal; and attenuation control means for turning off said attenuation means when said first judgment means decides that said electric field intensity is low, and for turning off said attenuation means when said second judgment means decides that said synchronizing signal is included in said radio signal and said first judgment means decides that said electric field intensity is high, and for turning off said attenuation means when said third judgment means decides that said radio signal is not a signal which should be received by said radio apparatus, and for turning on said attenuation means when said third judgment means decides that said radio signal is a signal which should be received by said radio apparatus.

2. The control unit, as claimed in claim 1, further comprising:

attenuation setting means for setting an attenuation value corresponding to said electric field intensity of said radio signal to said attenuation means.

3. The control unit, as claimed in claim 1, further comprising:

reception control means for turning on/off said reception means at predetermined time intervals.

4. The control unit, as claimed in claim 1, wherein said reception means comprises:

an antenna for receiving said radio signal;

said attenuation means;

a high-frequency amplifier for amplifying a high-frequency component of the radio signal attenuated by said attenuation means; and a demodulator for detecting a signal with a desired frequency from the radio signal amplified by said high-frequency amplifier and for demodulating the detected signal.

5. The control unit, as claimed in claim 4, wherein said radio apparatus is a radio selective-calling receiver for receiving a POCSAG signal.

6. The control unit, as claimed in claim 5, wherein said third judgment means comprises:

a stop signal detector for detecting a bit rate of an information stop signal in a system using said POCSAG signal from said radio signal.

7. The control unit, as claimed in claim 6, wherein said third judgment means decides that cross modulation occurs in said radio signal and that said radio signal is a signal which should not be received by said radio apparatus when: i) said first judgment means decides that said electric field intensity is high, ii) said second judgment means decides that said synchronizing signal is not included in said radio signal, and iii the bit rate of said information stop signal is not detected by said stop signal detector.

8. The control unit, as claimed in claim 4, wherein said third judgment means comprises:

a bit rate detector for detecting a bit rate of said radio signal.

9. The control unit, as claimed in claim 8, wherein said third judgment means decides that cross modulation occurs in said radio signal and that said radio signal is a signal which should not be received by said radio apparatus when: i) said first judgment means decides that said electric field intensity is high, ii) said second judgment means decides that said synchronizing signal is not included in said radio signal, and iii the bit rate of said radio signal is not detected by said bit rate detector.

10. A control method for attenuating a radio signal received by a radio apparatus, comprising the steps of:

performing a first judgment for judging whether an electric field intensity of a radio signal is high;

performing a second judgment for judging whether a synchronizing signal is included in said radio signal;

performing a third judgment for judging whether said radio signal is a signal which should be received by said radio apparatus when said first judgment decides that the electric field intensity of said radio signal is high and said second judgment decides that a synchronizing signal is not included in said radio signal; and attenuating said radio signal when said third judgment decides that said radio signal is a signal which should be received by said radio apparatus, and for not attenuating said radio signal at all other times.

11. The control method, as claimed in claim 10, wherein said third judgment comprises the steps of:

performing a fourth judgment for judging whether a bit rate of an information stop signal in a system using a POCSAG signal of a radio selective-calling receiver is detected from said radio signal; and deciding that cross modulation occurs in said radio signal and that said radio signal is not a signal which should be received by said radio apparatus when said fourth judgment decides that the bit rate of an information stop signal is not detected.

12. The control method, as claimed in claim 10, further comprising the step of:

stopping attenuation of said radio signal when it is decided that the electric field intensity of said radio signal is low.

13. The control method, as claimed in claim 11, further comprising the step of:

stopping attenuation of said radio signal when it is decided that the electric field intensity of said radio signal is high and said synchronizing signal is detected from said radio signal.

14. The control method, as claimed in claim 11, further comprising the step of:

stopping attenuation of said radio signal when it is decided that the electric field intensity of said radio signal is high and the bit rate of said information stop signal is detected from said radio signal.

15. The control method, as claimed in claim 10, wherein said third judgment comprises the steps of:

performing a fifth judgment for judging whether a bit rate of a signal which should be received by said radio apparatus is detected from said radio signal; and deciding that cross modulation occurs in said radio signal when: i) said first judgment decides that the electric field intensity is high, ii) said second judgment decides that said synchronizing signal is not included in said radio signal, and iii) said fifth judgment decides that the bit rate of a signal which should be received by said radio apparatus is not detected from said radio signal.

16. The control method, as claimed in claim 15, further comprising the step of:

stopping attenuation of said radio signal when it is decided that the electric field intensity of said radio signal is high and the bit rate of a signal which should be received by said radio apparatus is detected from said radio signal.

17. The control unit, as claimed in claim 1, wherein said attenuation control means turns on said attenuation means only when said third judgment means decides that said radio signal is a signal which should be received by said radio apparatus.

18. The control unit, as claimed in claim 6, wherein, when said first judgment means decides that said electric field intensity is high and said second judgment means decides that said synchronizing signal has not been detected and said stop signal detector does not detect the bit rate of an information stop signal, said attenuation control means either turns off said attenuation means if said attenuation means was previously on or keeps said attenuation means turned off if said attenuation means was previously off.

19. A control unit for attenuating a radio signal received by a radio apparatus comprising:

an antenna configured to receive a radio signal;

an attenuator connected to said attenuator and configured to attenuate said radio signal;

a high-frequency amplifier connected to an output of said attenuator and configured to provide amplification of high-frequency components of a signal input to said high-frequency amplifier;

a level detector connected to an output of said high-frequency amplifier and configured to judge whether a signal input to said level detector is greater than a predetermined value;

a demodulator connected to the output of said high-frequency amplifier and configured to demodulate a signal input to said demodulator;

a sync-signal detector connected to an output of said demodulator and configured to determine whether a signal input to said sync-signal detector includes a synchronizing signal;

a stop signal bit rate detector connected to the output of said demodulator and configured to detect whether a bit rate of an information stop signal is included as information in a signal input to said stop signal bit rate detector, said information stop signal corresponding to a POCSAG signal; and a decision circuit connected to said level detector, said sync-signal detector, and said stop signal bit rate detector, said decision circuit configured to turn said attenuator on only when the following conditions are all satisfied: i) said level detector judges that the signal input to said level detector is greater than the predetermined value, ii) said sync-signal detector determines that the signal input to said sync-signal detector does not include the synchronizing signal, and iii) said stop signal bit rate detector detects that the bit rate of an information stop signal is not included as information in the signal input to said stop signal bit rate detector, wherein said decision circuit turns said attenuator off at all other times.

* * * * *